United States Patent
Betzler et al.

(10) Patent No.: US 8,244,754 B2
(45) Date of Patent: Aug. 14, 2012

(54) SYSTEM AND METHOD FOR OBJECT SEARCHING IN VIRTUAL WORLDS

(75) Inventors: Boas Betzler, Wappingers Falls, NY (US); Xing Fang, Beijing (CN); Neil A. Katz, Parkland, FL (US); Dong Jun Lan, Beijing (CN); Sheng Lu, Beijing (CN); Meng Ye, Beijing (CN); Zi Yu Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 243 days.

(21) Appl. No.: 12/697,845

(22) Filed: Feb. 1, 2010

(65) Prior Publication Data

US 2011/0191365 A1   Aug. 4, 2011

(51) Int. Cl.
*G06F 17/30* (2006.01)

(52) U.S. Cl. ........................................ 707/769; 707/709

(58) Field of Classification Search .................. 715/752, 715/757, 206, 716; 707/1, 10, 103, 3, 709; 706/46, 21
See application file for complete search history.

(56) References Cited

U.S. PATENT DOCUMENTS

| | | | |
|---|---|---|---|
| 5,454,106 A | 9/1995 | Burns et al. | |
| 5,907,837 A | 5/1999 | Ferrel et al. | |
| 6,002,853 A | 12/1999 | de Hond | |
| 6,348,927 B1 | 2/2002 | Lipkin | |
| 6,377,945 B1 | 4/2002 | Risvik | |
| 6,381,607 B1 | 4/2002 | Wu et al. | |
| 6,480,837 B1 | 11/2002 | Dutta | |
| 6,591,370 B1 | 7/2003 | Lovett et al. | |
| 6,922,685 B2 * | 7/2005 | Greene et al. ........................ 1/1 |
| 7,181,444 B2 | 2/2007 | Porter et al. | |
| 7,233,978 B2 | 6/2007 | Overton et al. | |
| 7,249,123 B2 | 7/2007 | Elder et al. | |
| 7,472,349 B1 * | 12/2008 | Srivastava et al. ..................... 1/1 |
| 7,991,718 B2 * | 8/2011 | Horvitz et al. .................. 706/21 |
| 8,041,704 B2 * | 10/2011 | Cook et al. ..................... 707/709 |
| 2002/0188678 A1 | 12/2002 | Edecker et al. | |
| 2003/0122858 A1 * | 7/2003 | Mauve ......................... 345/706 |
| 2003/0126136 A1 * | 7/2003 | Omoigui ........................ 707/10 |
| 2003/0164827 A1 | 9/2003 | Gottesman et al. | |
| 2007/0033170 A1 * | 2/2007 | Sull et al. ........................... 707/3 |
| 2009/0006297 A1 * | 1/2009 | Horvitz et al. .................. 706/46 |
| 2009/0119572 A1 * | 5/2009 | Koivunen ..................... 715/206 |
| 2009/0210444 A1 * | 8/2009 | Bailey et al. ............. 707/103 R |
| 2009/0254842 A1 * | 10/2009 | Leacock et al. ............... 715/757 |
| 2009/0254843 A1 * | 10/2009 | Van Wie et al. ............... 715/757 |
| 2009/0288007 A1 * | 11/2009 | Leacock et al. ............... 715/716 |
| 2010/0146085 A1 * | 6/2010 | Van Wie et al. ............... 709/220 |
| 2011/0185286 A1 * | 7/2011 | Moyers et al. ................ 715/752 |

OTHER PUBLICATIONS

Berners-Lee et al., "Uniform Resource Identifier (URI): Generic Syntax", Standards Track, mhtml:file://G:\IBM\ 105\ 21859\ BACKGROUND\RFC%203986%20(FINAL)%20-%20U, last printed Feb. 22, 2008, pp. 1-62.

Pantovic et al., "Improved Indexing for Distributed Virtual University" IEEE, 30th ASEE/IEEE Frontiers in Education Conference, Oct. 18-21, 2000, pp. F3D-12.

Reynolds et al., "Internet Official Protocol Standards", Standards Track, http://tools.ietf.org/html/rfc2500, last printed Feb. 22, 2008, pp. 1-28.

* cited by examiner

*Primary Examiner* — James Trujillo
*Assistant Examiner* — Thong Vu
(74) *Attorney, Agent, or Firm* — Scully, Scott, Murphy & Presser, P.C.; Daniel P. Morris, Esq.

(57) ABSTRACT

A system and method enabling the search for a three-dimensional virtual world object across the universe of virtual worlds by utilizing a two-step search process to first identify the object and second, to actively locate and generate a URI to all presently manifest instances of that object.

18 Claims, 4 Drawing Sheets

SYSTEM AND METHOD FOR OBJECT SEARCHING IN VIRTUAL WORLDS

BACKGROUND OF THE INVENTION

1. Field of the Invention

The invention relates generally to three-dimensional simulated environments or "virtual worlds", and more particularly, to a system and method of searching for a three-dimensional object ("virtual world object") existing across multiple virtual worlds.

2. Description of the Prior Art

The only way to efficiently locate a particular piece of information on a large network of information is to utilize a search engine. An Internet search engine is designed to search the World Wide Web for web-pages, images and other types of information. Internet search engines gather information by accessing web sites and indexing their contents, a process sometimes referred to as "crawling" since early search engines would index a web site and follow links from that web site to other web sites. Google™, for example, is a well-known search engine that accepts a textual input and provides a search button. Pressing the search button initiates a search and links to information matching the input are displayed.

Many patents describe and improve upon retrieving, indexing, querying, and presentation of information on a large network. U.S. Pat. No. 5,454,106 teaches using natural language to query a search engine. U.S. Pat. No. 6,381,607 teaches a technique for indexing of information for better retrieval. U.S. Pat. No. 6,377,945 teaches a method of data retrieval. U.S. Pat. No. 6,480,837 describes the use of weighted search results to improve the presentation of search results. However, these inventions all operate within the conventional search-engine architecture described.

Conventional search engine designs operate on the presumption that discovered contents will remain in the same location over time. In essence, traditional search engine fodder exists in two-dimension because it can be located using a single address, or a Uniform Resource Identifier ("URI") as proposed in Internet Engineering Task Force ("IETF"), Proposed Standard RFC 3986 that is a prerequisite to traditional search engine operation.

A virtual world is a three-dimensional environment created by a computer and multiple virtual worlds may collectively form a universe of the virtual worlds. A virtual world may depict a purely fictional setting existing only in the mind of its creator as well as a real-world setting. A virtual world contains three-dimensional graphical objects, collectively known as virtual world objects, represented by characteristics such as a primitive and a texture. The primitive defines the object's shape and the texture is an image wrapped around the primitive to give it a realistic appearance. Other characteristics of the objects include video, audio and executable program code.

While real world objects have three dimensions, the virtual world objects, however, exist in six dimensions. The first three dimensions identify a virtual world object's coordinates within a virtual world. The fourth-dimension governs time, as virtual world objects are capable of movement. The fifth-dimension is necessary to identify a specific instance, or clone, of the virtual world object, since it may exist in multiple locations at the same time. The sixth and final dimension identifies the specific virtual world within the universe of virtual worlds. The complexity of movement and parallel existence of virtual world objects make it impossible to be assigned a persistent static reference such as a URI. As such, searching in six dimensions is beyond the capability of existing search engine technology because that technology is grounded in the two-dimensional world of static URI references. It would be advantageous to provide functionality for locating a virtual world object in light of its complicated existence.

SUMMARY OF THE INVENTION

The present invention builds upon the conventional search and locating engine architecture and breaks free of its two-dimensional limitations. As is well known, the ability to search is predicated on the existence of an index. The index in the present invention ("object index") includes an entry for every virtual world object existing within the universe of virtual worlds. According to the present invention, a virtual world object search system is proposed, comprising a publication storage device, an adaptor means, an object discovery means, and an object search means which includes an interface to accept user input search parameters. The present invention presents a search method which segments the search process into two steps. Segmentation is necessary to accommodate the mobile nature of virtual world objects. The first search step identifies a virtual world object and the second step locates the virtual world object.

Thus, according to one aspect of the present invention, there is provided a system for locating a three-dimensional object across a universe of virtual worlds, said universe of virtual worlds comprising one or more virtual worlds each virtual world executing as an application program, and accessible via a computer network, said object being uniquely identified by an object identifier, and said object having a plurality of properties associated therewith and said object having one or more current locations in said universe of virtual worlds each location represented by a URI, said system including a virtual world object locator interface means associated with a corresponding virtual world, for obtaining said one or more object current locations based on an object identifier of said object; a publication storage device for storing a plurality of a plurality of object properties for all objects in said universe of virtual worlds, said object properties including at least said object identifier; an adaptor means for providing a standard command interface to communicate with a corresponding virtual world application program over said computer network; an object discovery means for retrieving a plurality of a plurality of object properties for all said objects within said universe of virtual worlds, and storing said retrieved object properties in said publication storage device, and said object discovery means utilizing said adaptor means to communicate with said universe of virtual worlds; an object search means for obtaining one or more URIs, each referencing a location of said object's current locations within the universe of virtual worlds, using said object identifier of said object obtained from said publication storage device, and said object search means utilizing said adaptor means to communicate with said virtual world object locator interface.

According to another aspect of the present invention, there is provided a method for locating a three-dimensional object across a universe of virtual worlds, said universe of virtual worlds comprising one or more virtual worlds each virtual world executing as an application program, and accessible via a computer network, said object being uniquely identified by an object identifier, and said object having a plurality of properties associated therewith and said object having one or more current locations in said universe of virtual worlds each location represented by a URI, said method including providing a virtual world object locator interface means associated with a corresponding virtual world, for obtaining one or more object current locations based on an object identifier of said object; providing a publication storage device populated with a plurality of a plurality of object properties for all objects in said universe of virtual worlds, said object properties including at least said object identifier; providing an adaptor corresponding to a virtual world; receiving user input for object search request; providing an object search result list comprising one or more said object identifiers from said publication storage device in response to user input wherein said object search result list membership is determined by said user input; accepting an object identifier from said object search result list in response to user selection of said object identifier; obtaining object current locations of said accepted object identifier; and providing an object current location result list comprising the current object locations of the accepted object identifier, wherein each object current location result list entry has at least a URI associated therewith.

According to still another aspect of the present invention, there is provided a computer program product for locating a three-dimensional object across a universe of virtual worlds, said universe of virtual worlds comprising one or more virtual worlds each virtual world executing as an application program, and accessible via a computer network, said object being uniquely identified by an object identifier, and said object having a plurality of properties associated therewith and said object having one or more current locations in said universe of virtual worlds each location represented by a URI, the computer program product comprising including a computer usable medium having computer usable program code embodied therewith, the computer usable program code comprising including computer usable program code configured to: provide a virtual world object locator interface means associated with a corresponding virtual world for obtaining one or more object current locations based on an object identifier of said object, provide a publication storage device populated with a plurality of a plurality of object properties for all objects in said universe of virtual worlds, said object properties including at least said object identifier, provide an adaptor corresponding to a virtual world, to receive user input for object search request, provide an object search result list comprising one or more said object identifiers from said publication storage device in response to user input wherein said object search result list membership is determined by said user input, accept an object identifier from said object search result list in response to user selection of said object identifier, obtain object current locations of said accepted object identifier, and provide an object current location result list comprising the current object locations of the accepted object identifier, wherein each object current location result list entry has at least a URI associated therewith.

According to still further another aspect of the present invention, there is provided a method of deploying a computer program product for locating a three-dimensional object across a universe of virtual worlds, said universe of virtual worlds comprising one or more virtual worlds each virtual world executing as an application program, and accessible via a computer network, said object being uniquely identified by an object identifier, and said object having a plurality of properties associated therewith and said object having one or more a current locations wherein said current location is the object's position within a virtual world, and wherein said object's current location being represented by a URI, wherein, when executed, the computer program performs the steps of providing a virtual world object locator interface means associated with a corresponding virtual world, for obtaining one or more object current locations based on an object identifier; providing a publication storage device populated with a plurality of a plurality of object properties for all objects in said universe of virtual worlds, said object properties including at least said object identifier; providing an adaptor corresponding to a virtual world; receiving user input for object search request; providing a object search result list comprising one or more said object identifiers from said publication storage device in response to user input wherein said object search result list membership is defined by said user input; accepting an object identifier from said object search result list in response to user selection of said object identifier; obtaining object current locations of said accepted object identifier; and providing an object current location result list comprising the current object locations of the accepted object identifier, wherein each object current location result list entry has at least a URI associated therewith.

DETAILED DESCRIPTION OF THE PREFERRED EMBODIMENT

Figure 1:
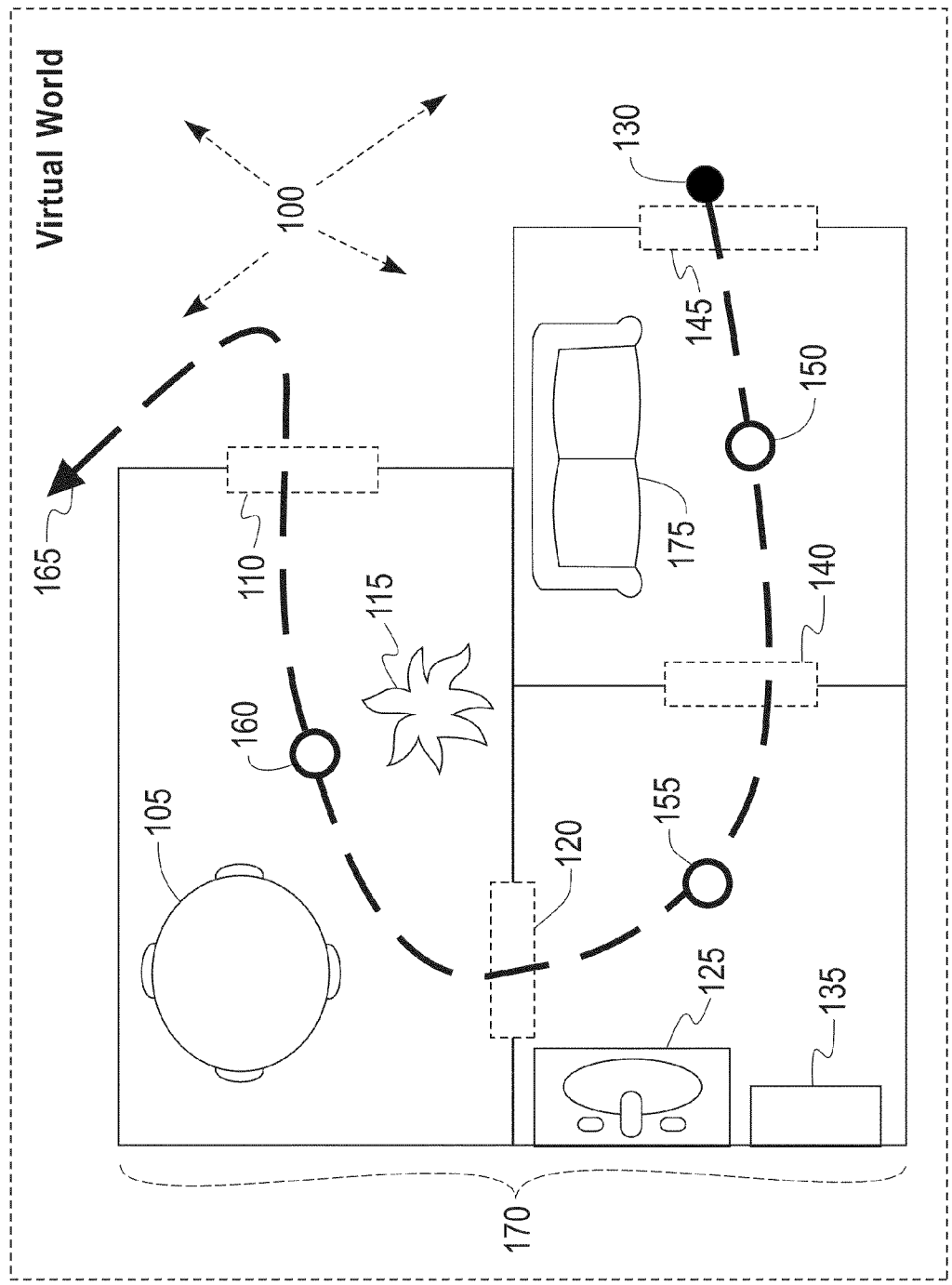
FIG. 1 illustrates a walk-through in an exemplary virtual world environment in accordance with the present invention.

Searching for a virtual world object within the universe of virtual worlds requires enhancements to virtual world server applications and the virtual world objects contained therein. Virtual world server applications are implemented in a variety of architecturally distinct designs. Despite the differences in implementation, a virtual world server application generally follows a client-server model, in which multiple client applications communicate over a network with what appears to be a single server acting as conduit between those client applications. Virtual world server applications supporting search of the three-dimensional objects must provide a function interface for locating a presently manifest virtual world object within that virtual world. Also, virtual world objects each must have a unique identifier within the entire virtual world universe and must provide searchable information through a descriptive property interface.

Virtual world objects require unique identifiers to be located. Presently, virtual world objects may be located from within a specific virtual world. Even though object identification indications are proprietary to a specific virtual world, a particular identification scheme may conflict with or be incompatible with otherwise similar objects found in another virtual world in the universe of the virtual worlds. To properly identify a particular virtual world object independent of its environment will require an identifier that is unique across the namespace of all virtual worlds. A Universally Unique Identifier ("UUID") is one example of a structure that can uniquely identify a virtual world object. The UUID specification is set forth in the Internet Engineering Task Force ("IETF") in Proposed Standard RFC 4122, fully incorporated by reference herein. The use of the UUID enables distributed systems to uniquely identify information without significant central coordination, and its use for identifying objects is well known in the art. Virtual world objects identified by UUID can be combined into a single database without name conflicts. A virtual world object may exist in multiple locations within multiple virtual worlds of the universe as facilitated by the UUID naming indication.

An object definition is the information necessary for a computer to create or manifest an object, which includes the primitive and texture. Some virtual world objects will have a definition that exists independently of any particular virtual world. Distinguishing between an object location and the location of an object definition is critical: an object location is where that object is presently manifest and changes as the virtual world object moves; whereas the location of an object definition is persistent and can be referenced by a URI. As such, traditional search engine architecture is well suited for locating object definitions but not the current object locations having six dimensions. The present invention is directed to searching for an object's current location rather than the location of an object definition.

When referenced, the hosting server of a virtual world would deliver back a document comprising attributes similar to the following example:

```
<virtual object>
    <geometry definition>
        ...
    </geometry definition>
    <state>
        <location>
            X=1223
            Y=4233
            Z=2134
        </location>
        ....
    </state>
    <texture>
        http://texture.server1.com/path/subpath/texture1.gif
    </texture >
</virtual object>
```

It is important for the purpose of description to keep distinct the usage of URI as meaning virtual object location, as sometimes it means virtual object identifier. In the following description, virtual object identifier and virtual object location are of different meanings. The following describes the two terms in the process of searching: in Step 1, crawler processes collect virtual objects' identifiers and their descriptions. At this time, the locations of virtual objects are not needed, because the locations of the objects may change; in Step 2, users searching for particular virtual objects in the system get the objects' identifiers as a result; and in Step 3, when users try to access the virtual objects, the virtual object identifiers will be translated into their current locations contained in the URIs.

An independently defined object is referenced by a URI, and in some instances, may not have a unique identifier. For virtual world objects without a UUID but referenced by a URI, a UUID may be generated based on the URI itself. This can be accomplished using the UUID generator of Version 3 (MD5 hash) UUID generator, which derives a UUID from a URI via the Message-Digest algorithm 5 ("MD5") as specified in the IETF published Proposed Standard RFC 1321, incorporated herein by reference. It is understood that there are other implementation options, e.g. a random number generator or a generator using SHA-1 hashes. The benefit of the MD5 algorithm using a URI as base for the hash is that multiple references to the same URI may be identical and therefore can be used to optimize cache behavior.

Further, virtual world objects must provide a "description" property. The description property provides descriptive information about the virtual world object in textual form constituting the corpus of searchable information. Extensible Markup Language (XML) can be used to enrich quantity and quality of the description information available, thereby giving an unlimited range of searchable sub-properties. Another advantage of XML is that it allows for seamless extension in the future. A non-limiting example of the information based on XML returned by the description property is as follows:

```
<name> Jack </name>
<description> I'm a dog named Jack. </description>
<type> dog </type>
<characteristic> male </characteristic>
<weight> eight pounds </weight>
<created> February 22, 2032 11:21:00 AM </created>
<author> Boas Betzler </author>
```

Another non-limiting example of a description property implementation is to generate the property dynamically, which is depicted in the following code:

```
Default
{
name = "Jack";
description = "I'm a dog named Jack,";
    listen (string message )
    {
        if (message == "DESCRIPTION" )
        {
        return ( "<name>" + name +
        "</name><description>" + description +
        "</description>...");
        }
    ...
}
```

In the non-limiting example, the virtual world object responds to the message "DESCRIPTION" over by returning a message containing the object's description. The message in this example being the name and the description as defined in the object itself. It is noted that embedding the "description" property into existing code impacts multi-world object definition requirements and in each virtual world, the function implementation should specify reasonable value to this property, such as using existing property value.

Virtual world servers must also provide a virtual world object location interface. The interface will implement functionality for obtaining the present location or locations of a virtual world object within that virtual world. Assume for the purpose of this discussion the interface is implemented through a GetObjectLocation function. The GetObjectLocation function will take a UUID as a parameter and return a list of coordinates where an identified object is presently manifest within that virtual world. An example definition of the GetObjectLocation function might be:

URI.GetObjectLocation(object identifier), wherein object identifier is a UUID.

An example call to a virtual world server application GetObjectLocation function may be:

VWorld.GetObjectLocation("{650e9420-g29b-43f4-b716-446655440554}")

Table 1 below shows an example result-set returned in response to the above function call showing the object's "current location" for each instance object, where X, Y and Z represent coordinates within the virtual world "VWorld." It is noted in Table 1 that because UUID is one virtual object's identifier, so one UUID only indicates one virtual object.

TABLE 1

| UUID | X | Y | Z | URI |
|---|---|---|---|---|
| {650E9420-G29B-43F4-B716-446655440554} | 10 | 55 | 669 | |

The precise function interface and result-set for the GetObjectLocation function are not necessarily uniform among virtual world server applications. The only requirement is that the virtual world server application can provide the current locations for an object based on an object identifier. A virtual world adaptor as discussed in detail below handles the different implementations of the GetObjectLocation function in the virtual worlds.

Figure 2:
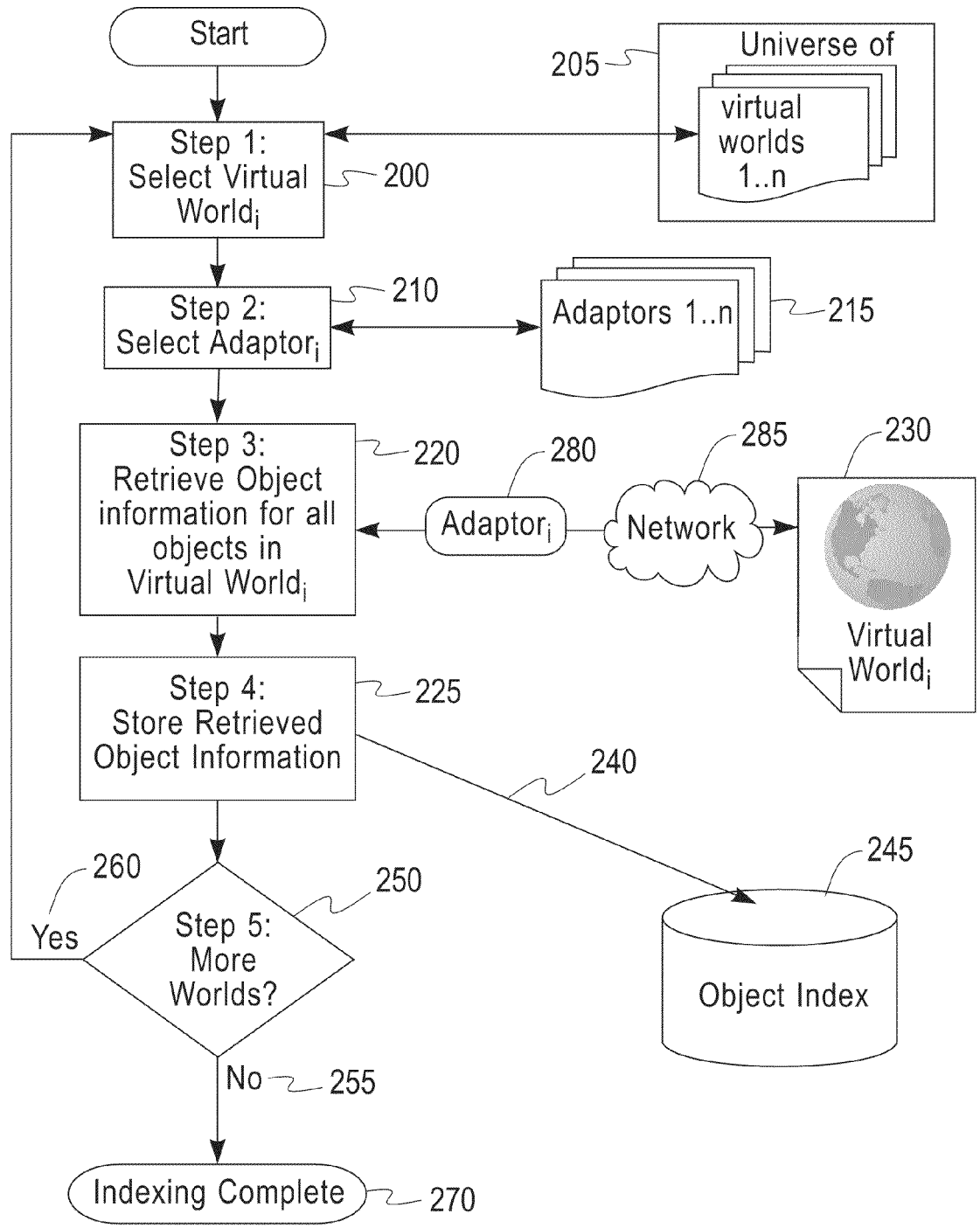
FIG. 2 illustrates exemplary methods steps implemented for populating a searchable object index in accordance with the present invention; and, FIG. 3 illustrates exemplary method steps to obtain a location to a virtual world object's current location(s) in accordance with the present invention.
Figure 3:
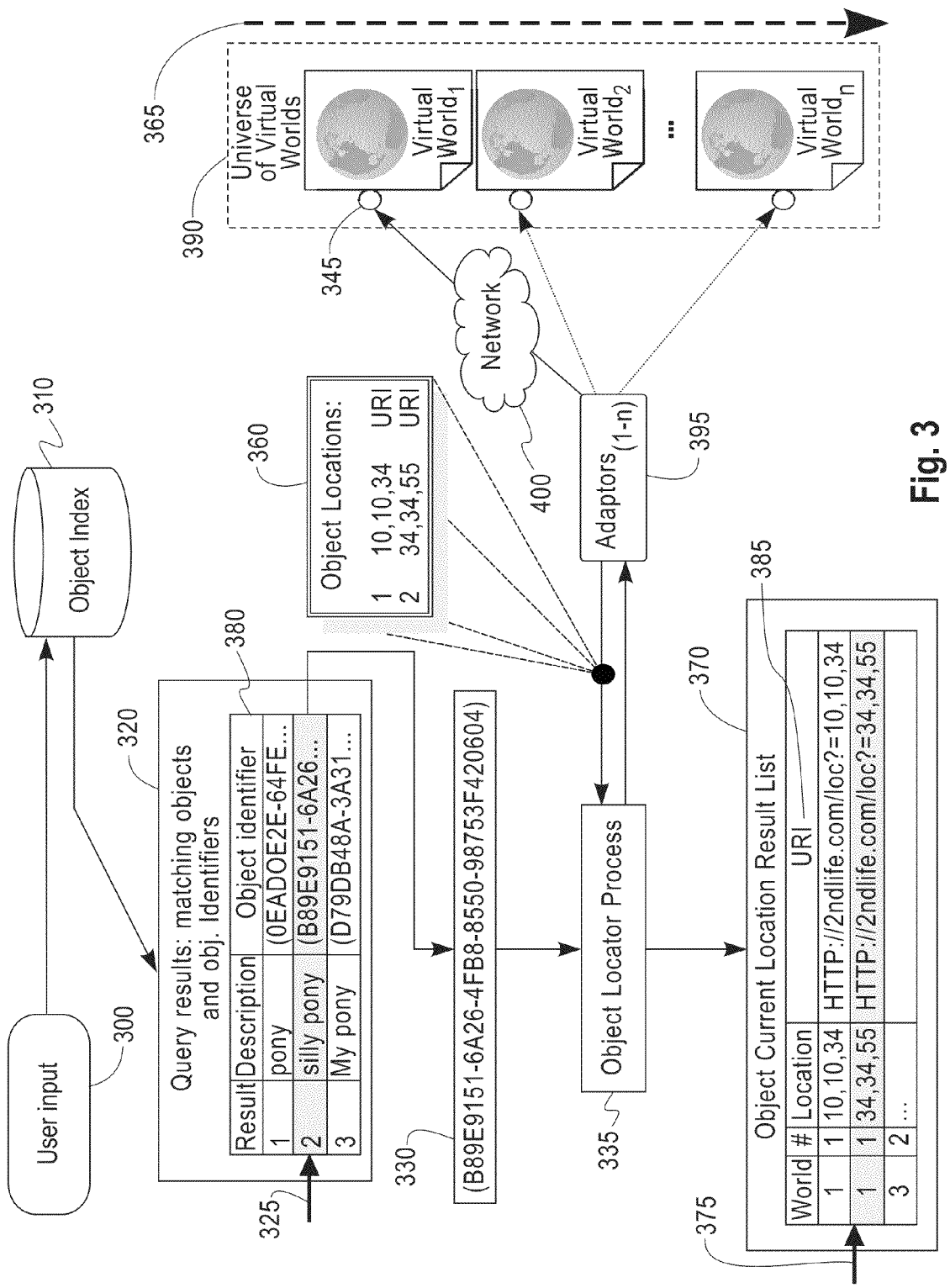

According to the present invention, there is additionally provided a virtual world adaptor to provide a standard interface between the search-engine and varying virtual world server implementation, i.e., a think program implementing a virtual function table or wrapper function. Multiple adaptors are shown in FIG. 2 at 380 and 315 and one adaptor is shown in FIG. 3 at 495. For example, a World-X brand server implementation capable of running parallel worlds would requires a sub world parameter shown as follows: World-X.GetObjectLocation(object identifier, sub world). Following this example, if a virtual world provider using the World-X brand server application has two virtual worlds w1 and w2 running in parallel, then the adaptor for virtual world w1 will translate a call to the GetObjectLocation function to the World-X specific form: GetObjectLocation(object identifier, "w1"). And the adaptor for virtual world w2 will translate a call to the GetObjectLocation function to the World-X specific form: GetObjectLocation(object identifier, "w2").

In another example, a World-Z brand server application implements the GetObjectLocation function as: World-Z.GetObjLoc(object identifier). In this instance, the adaptor will translate a call to the GetObjectLocation function to the World-Z specific form: GetObjLoc(object identifier).

Moreover, searching the universe of virtual worlds requires an index. The index in the present invention ("object index") comprises information pertaining to all objects existing within the universe of virtual worlds. The object index includes an object identifier field and a description field for each object. As described herein, it is understood that the description field is not limited solely to the object's description property, but rather refers to a collection of fields related to description of the object's index entry. That is, description means a set of fields containing searchable information.

Searchable fields may include character, numeric, and binary data types. Further division among character fields can be used to represent information in multiple languages. For example, if a virtual world object's description is in French, then "description_fr" contains the original text and "description en" will contain the French-English translation.

A binary data type field can store a wide variety of information formats. For example, a virtual world object's texture-map image can be stored in a binary field to permit a search based on an image rather than plain text. However the present invention contemplates processing not only text based but also picture based, video based and 3D model embodiments.

The picture search methods widely used by search engines such as Google are text based and resolve the problem of text to picture search. There are methods that resolve the problem of picture to picture search, for example the Generalized Virtual-Node (GVN) algorithm, proposed by Punpiti Piamsanga et. al., uses a K-tree to keep indexing the characteristics of images and further searches can be done based on it, such as the In-Picture Search Algorithm for Content-Based Image Retrieval.

Video searching includes programming means that finds a video similar to a given video segment. There are search methods available in the prior art, such as the methods described in http://groups.csail.mit.edu/graphics/pubs/siggraph2004_videomatching.pdf and http://www.springerlink.com/content/x56h18r180x6p4m4/, the whole contents and disclosure of each are fully incorporated by reference herein. In the present invention, a framework is provided so that different video search methods may be plugged in.

3D model searching is another important method in virtual world searching. Some algorithms have been proposed in the domain of computer graphics. For example, the paper entitled, "Feature-Based Similarity Search in 3D Object Databases" authored by Benjamin Bustos, Daniel A. Keim, Dietmar Saupe, Tobias Schreck, Dejan V. Vranid, wholly incorporated by reference herein, describes the 3D model based searching method. A feature-based similarity search described in the paper "3D Object Databases", ACM Computing Surveys (CSUR), v.37 n.4, p. 345-387, December 2005 is also wholly incorporated by reference herein.

Abstract data representing an object's model can be stored as character or binary data. An object's model is the information required to manifest or create the virtual world object. A model field allows search input to include an actual virtual world object. An advantageous aspect of a model-based search is that copies of a virtual world object can be detected.

An object discovery process is implemented to populate the object index. Populating the object index can be accomplished in several ways. A straightforward approach would be to simply walk-through each virtual world and record the descriptive information for all virtual world objects encountered in the process. The thoroughness of the object discovery process is achieved through rudimentary crawler application interface (AI), which may consist of many possible implementations known in the prior art. In an exemplary embodiment, the crawler divides the space into a set of small areas, each of which has a viewpoint, which is the central point of the small area. The crawler will then teleport to these viewpoints one by one. If a virtual object occupies the viewpoint, the crawler will collide and move to an adjacent position. In this case the area is further divided into quarters or even smaller area. The crawler walks through these new viewpoints successively. At each viewpoint, the crawler use Look, Retrieve and Navigate commands to collect information. The commands that follow illustrate, in a non-limiting sense, one example of the object discovery process. In an exemplary embodiment, the object discovery process executes commands to Look, Retrieve, and Navigate within a virtual world. Note that an adaptor will translate the Look, Retrieve and Navigate commands into a form expected by the virtual world. The Look command brings all objects into view from the current viewpoint. The Retrieve command returns the descriptive information for all objects visible from that viewpoint. For example, a Second Life® function that implements both the Look and Retrieve commands might be implemented as:

```
Default
{
    ...
    llShout(SEARCH_REQUEST_CHANNEL, SEARCH_REQUEST);
    ...
    listen ( integer channel, string name, key id, string message
    )
    {
        if (message == "DESCRIPTION" )
        {... }
    }
    ...
}
```

The Navigate command moves the crawler to a new viewpoint. With reference to FIG. 1, depicting an example of Home Interior virtual world. In this example, the crawler begins at viewpoint 130. The Look command reveals the exterior of a home 170, with an entry point at 145. Navigating through the door 145 leads to viewpoint 150 where the look command shows an entryway to the next room 140, and a loveseat 175. Next, the Navigate command walks the crawler through the door 140 to viewpoint at 155. The Look command will bring the sink 135 and the vanity 125 into view. At that same location 155, the Retrieve command will return the descriptive information for the vanity 125 and the vanity 135, as well as the two entryways 120 and 140. The Navigate command will then advance to the next viewpoint 160 and the same process is repeated, i.e., at the viewpoint 160, breakfast table 105 and plant 115 will be in view and their descriptive information captured with the Retrieve command before the crawler finally navigating out of the home through entryway 110.

FIG. 2 illustrates one possible implementation for indexing the virtual world objects retrieved by the crawler during the walking through of the virtual world. The method will be described in detail as follows.

In Step 1 depicted in 200, Virtual World$_i$, which one of the unvisited virtual worlds of Virtual World$_i$ through Virtual World$_n$, is selected, wherein i={1 . . . n} and n=number of virtual worlds in the universe of virtual worlds, as illustrated in 205.

In Step 2 depicted in 210, the Adaptor; corresponding to Virtual World$_i$ is selected among the Adaptor$_1$ through Adaptor$_n$, as illustrated in 215.

In Step 3 depicted in 220, the crawler retrieve the information for all objects in Virtual World$_i$ 230 through Network 285, assisted by the Adaptor$_i$ selected in Step 2, using the method disclosed hereinabove in connection with FIG. 1.

In Step 4 depicted in 225, the retrieved descriptive information for objects observed in Virtual World$_i$ is indexed in 245.

In Step 5 depicted in 250, the crawler determines if there are virtual worlds that have not been visited. The crawler will repeat Steps 1-4 until Virtual World$_{1-n}$ have all been visited when the crawler terminates the process and the indexing of the objects is completed in 270. Thereafter, the object index database 245 will include a record of each virtual world object encountered in the universe of virtual worlds 205. An alternative method to Steps 1 through 5 may include parallel executing of Steps 2 through Step 4 with regard to the Virtual Worlds.

In another embodiment, the object index may be populated by using a broker. A broker is a server process that remains inside the virtual world at all times and remains stationary, i.e., the broker does not move in the virtual world. The broker records descriptive information for the virtual world objects that pass within its view and uses its internal data structures to store data (e.g., its property field, variable space, etc.). The broker may collect information periodically or upon the event when an object passes by. However, it is understood that a browser information collection policy may be implemented. The collected information is defined by the objects which are queried. If some information has already been collected, the objects will want to close the query channel. For example, with reference to FIG. 1, a broker may be placed in the middle of each room 150, 155 and 160. There, the broker maintains the descriptive information until it is collected by another process after some interval of time. There are two methods to transfer the information to virtual world adaptors. The first one is to send the information to the crawler that is passing by the broker. The other method is to send the information to the virtual world adaptors after some interval of time.

In one aspect of the present invention, a two-step process is provided for locating a virtual world object in combination with the enhancements to the virtual world server implementations and the object naming indication. This two-step process is necessary because the same object may appear in more than one location within multiple-virtual worlds and the object's location is not static. Thus, the system and enhancements enable the rapid provision of a reference URI for each current location of a virtual world object based on user-input search parameters. This is accomplished by segmenting the traditional single-step query-result search into two distinct steps. The first step identifies the desired virtual world object and the second step actively seeks all current locations of that virtual world object and provides a list of corresponding URIs. Dividing the search into two steps is necessary because virtual world objects are capable of movement and thus do not have a persistent reference. The URIs generated in the second step permit the user to visit the object's location as of the moment the search is conducted.

The search steps are illustrated in FIG. 3. The first step in finding a virtual world object's current locations is to get the object identifier. To obtain the object identifier the object index 310 of virtual world objects is queried based on user input criteria 300, such criteria being plain text or other aforementioned input data types or structures. Matching objects and identifiers are returned as shown in 320, including object identifiers 380. Then a user, via a graphic interface, is able to select a matching object from the query results presented in 320. Selecting an entry 325 initiates the second search step by passing the object identifier selected in 330 to the object locator process 335.

The object locator process 335 gets the virtual world object's current locations based on its identifier. The result is a list of object locations 370 with corresponding URIs 385 referencing the presently manifest instances of the virtual world object within the universe of virtual worlds. To create the object location list 370, the object locator process 335 invokes the GetObjectLocation function in 345 for each virtual world 365 in the universe of virtual worlds 390. The results 360 returned from the processing at each virtual world are presented separately or, optionally, combined into a single result-set 370. Adaptors$_{(1-n)}$ 395 are selected during this step to accommodate variations in the implementation of the GetObjectLocation function across the universe of virtual worlds via network 400. A URI may be selected in 375 from the list of object locations 370 and used to access the virtual world object.

The present invention can be realized in hardware, software, or a combination of hardware and software. A typical combination of hardware and software could be a general purpose computer system with a computer program that, when being loaded and operational, controls the computer system such that it carries out the methods described herein. The present invention can also be embedded in a computer program product, which comprises all the features enabling the implementation of the methods described herein, and which, when loaded into a computer system, is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

Figure 4:
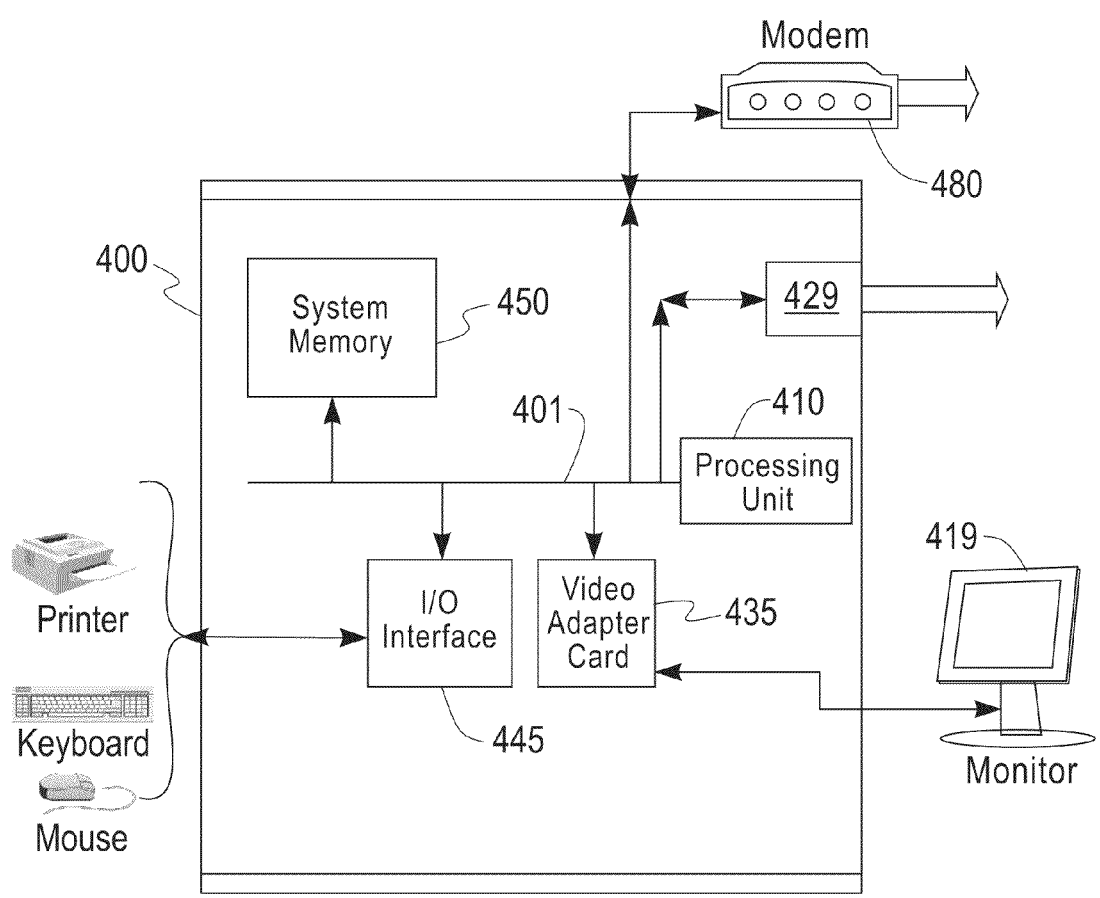
FIG. 4 illustrates an exemplary computer system in accordance with the present invention.

More specifically, as shown in FIG. 4, the computer system 400, includes one or more processors or processing units 410, a system memory 450, and an address/data bus structure 401 that connects various system components together. For instance, the bus 401 connects the processor 410 to the system memory 450. The bus 401 can be implemented using any kind of bus structure or combination of bus structures, including a memory bus or memory controller, a peripheral bus, an accelerated graphics port, and a processor or local bus using any of a variety of bus architectures such as ISA bus, an Enhanced ISA (EISA) bus, and a Peripheral Component Interconnects (PCI) bus or like bus device. Additionally, the computer system 400 includes one or more monitors 419 and, operator input devices such as a keyboard, and a pointing device (e.g., a "mouse") for entering commands and information into computer, data storage devices, and implements an operating system such as Linux, various Unix, Macintosh, MS Windows OS, or others.

The computing system 400 additionally includes: computer readable media, including a variety of types of volatile and non-volatile media, each of which can be removable or non-removable. For example, system memory 450 includes computer readable media in the form of volatile memory, such as random access memory (RAM), and non-volatile memory, such as read only memory (ROM). The ROM may include an input/output system (BIOS) that contains the basic routines that help to transfer information between elements within computer device 400, such as during start-up. The RAM component typically contains data and/or program modules in a form that can be quickly accessed by processing unit. Other kinds of computer storage media include a hard disk drive (not shown) for reading from and writing to a non-removable, non-volatile magnetic media, a magnetic disk drive for reading from and writing to a removable, non-volatile magnetic disk (e.g., a "floppy disk"), and an optical disk drive for reading from and/or writing to a removable, non-volatile optical disk such as a CD-ROM, DVD-ROM, or other optical media. Any hard disk drive, magnetic disk drive, and optical disk drive would be connected to the system bus 401 by one or more data media interfaces (not shown). Alternatively, the hard disk drive, magnetic disk drive, and optical disk drive can be connected to the system bus 401 by a SCSI interface (not shown), or other coupling mechanism. Although not shown, the computer 400 can include other types of computer readable media, Generally, the above-identified computer readable media provide non-volatile storage of computer readable instructions, data structures, program modules, and other data for use by computer 400. For instance, the readable media can store an operating system (O/S), one or more application programs, such as video editing client software applications, and/or other program modules and program data for enabling video editing operations via Graphical User Interface (GUI).

Input/output interfaces 445 are provided that couple the input devices to the processing unit 410. More generally, input devices can be coupled to the computer 400 through any kind of interface and bus structures, such as a parallel port, serial port, universal serial bus (USB) port, etc. The computer environment 400 also includes the display device 419 and a video adapter card 435 that couples the display device 419 to the bus 401. In addition to the display device 419, the computer environment 400 can include other output peripheral devices, such as speakers (not shown), a printer, etc. I/O interfaces 445 are used to couple these other output devices to the computer 400.

As mentioned, computer system 400 is adapted to operate in a networked environment using logical connections to one or more computers, such as the server device that may include all of the features discussed above with respect to computer device 400, or some subset thereof. It is understood that any type of network can be used to couple the computer system 400 with server device 420, such as a local area network (LAN), or a wide area network (WAN) (such as the Internet). When implemented in a LAN networking environment, the computer 400 connects to local network via a network interface or adapter 429 that support the above-mentioned Gigabit over Copper Ethernet as well as Jumbo Frames. When implemented in a WAN networking environment, the computer 400 connects to the WAN via a high speed cable/dsl modem 480 or some other connection means. The cable/dsl modem 480 can be located internal or external to computer 400, and can be connected to the bus 401 via the I/O interfaces 445 or other appropriate coupling mechanism. Although not illustrated, the computing environment 400 can provide wireless communication functionality for connecting computer 400 with remote computing device, e.g., an application server 420 (e.g., via modulated radio signals, modulated infrared signals, etc.).

Examples in the present invention make specific reference to SecondLife®, however it is understood that the system and methods presented are intended to be applicable to any virtual world implementation including but not limited to World of Warcraft, Google Lively, Activeworld™.

Although the embodiments of the present invention have been described in detail, it should be understood that various changes and substitutions can be made therein without departing from the spirit and scope of the inventions as defined by the appended claims. Variations described for the present invention can be realized in any combination desirable for each particular application. Thus, particular limitations, and/or embodiment enhancements described herein, which may have particular advantages to a particular application need not be used for all applications. Also, not all limitations need be implemented in methods, systems and/or apparatus including one or more concepts of the present invention.

What is claimed is:

1. A method for locating a three-dimensional object across a universe of virtual worlds, said universe of virtual worlds comprising one or more virtual worlds each virtual world executing as an application program, and accessible via a computer network, said object being uniquely identified by an object identifier, and said object having a plurality of properties associated therewith and said object having one or more current locations in said universe of virtual worlds each location represented by a URI, said method comprising:

providing a virtual world object locator interface means associated with a corresponding virtual world, for obtaining one or more object current locations based on an object identifier of said object;

providing a publication storage device populated with a plurality of object properties for all objects in said universe of virtual worlds, said object properties including at least said object identifier;

providing an adaptor corresponding to a virtual world;

receiving user input for object search request;

providing an object search result list comprising one or more said object identifiers from said publication storage device in response to user input wherein said object search result list membership is determined by said user input;

accepting an object identifier from said object search result list in response to user selection of said object identifier;

obtaining object current locations of said accepted object identifier; and providing an object current location result list comprising the current object locations of the accepted object identifier, wherein each object current location result list entry has at least a URI associated therewith, wherein populating said publication storage device with a plurality of object properties comprises:

marking all virtual worlds in the universe of virtual worlds as unvisited;

selecting an unvisited virtual world from the universe of virtual worlds;

selecting an adaptor corresponding to said selected virtual world;

obtaining said plurality of a plurality of object properties for all objects within said selected virtual world;

storing said obtained plurality of a plurality of object properties in said publication storage device;

marking said selected virtual world as visited; and repeating steps b-f until there are no unvisited virtual worlds.

2. The method for locating a three-dimensional object across a universe of virtual worlds of claim 1, wherein the step obtaining object current locations of said accepted object identifier comprises the steps of:

a) creating an empty object current location result list;

b) marking all virtual worlds in the universe of virtual worlds as unvisited;

c) selecting an unvisited virtual world from the universe of virtual worlds;

d) selecting an adaptor corresponding to said selected virtual world;

e) requesting object current locations from said virtual world object locator interface means of said selected virtual world based on said accepted object identifier utilizing said selected adaptor;

f) receiving object current locations of said accepted object identifier from said virtual world object locator interface means of said selected virtual world utilizing said selected adaptor;

g) including said received object current locations in said object current location result list;

h) marking said selected virtual world as visited;

i) repeating steps c-h until there are no unvisited virtual worlds; and j) providing said object current location result list.

3. The method of claim 1, wherein the step of obtaining said plurality of object properties for all objects within said selected virtual world comprises the steps:

i) navigating to an initial virtual world viewpoint;

ii) collecting descriptive information from each object within view;

iii) determining existence of and navigating to next unvisited viewpoint; and iv) repeating steps (ii)-(iii) until all viewpoints are visited.

4. The method of claim 1, wherein the step of obtaining said plurality of object properties for all objects within said selected virtual world comprises the steps:

i) navigating to an initial virtual world viewpoint;

ii) collecting descriptive information from a plurality of brokers within view, wherein said brokers being server processes that remain stationary across said selected virtual world;

iii) determining existence of and navigating to next unvisited viewpoint; and iv) repeating steps (ii)-(iii) until all viewpoints are visited.

5. The method of claim 1, wherein the step of obtaining said plurality of object properties for all objects within said selected virtual world comprises the steps:

i) placing a plurality of brokers in said selected virtual world, said brokers being server processes that remain stationary across said selected virtual world;

ii) collecting descriptive information from all objects passing by said brokers;

iii) transmitting said collected descriptive information to said adaptor;

iv) releasing said collected descriptive information; and v) repeating steps (ii)-(iv).

6. The method for locating a three-dimensional object across a universe of virtual worlds of claim 1, wherein said adaptor provides a standard command interface implemented by the use of a thunk program translating a set of standard commands of said interface into a set of corresponding commands specific to the virtual world to which said adaptor corresponds.

7. A computer program product for locating a three-dimensional object across a universe of virtual worlds, said universe of virtual worlds comprising one or more virtual worlds each virtual world executing as an application program, and accessible via a computer network, said object being uniquely identified by an object identifier, and said object having a plurality of properties associated therewith and said object having one or more current locations in said universe of virtual worlds each location represented by a URI, the computer program product comprising:

a non-transitory computer usable medium having computer usable program code embodied therewith, the computer usable program code comprising:

computer usable program code configured to:
provide a virtual world object locator interface means associated with a corresponding virtual world for obtaining one or more object current locations based on an object identifier of said object,
provide a publication storage device populated with a plurality of object properties for all objects in said universe of virtual worlds, said object properties including at least said object identifier,
provide an adaptor corresponding to a virtual world, to receive user input for object search request,
provide an object search result list comprising one or more said object identifiers from said publication storage device in response to user input wherein said object search result list membership is determined by said user input,
accept an object identifier from said object search result list in response to user selection of said object identifier,
obtain object current locations of said accepted object identifier, and
provide an object current location result list comprising the current object locations of the accepted object identifier, wherein each object current location result list entry has at least a URI associated therewith, wherein to populate said publication storage device with a plurality of object properties, said computer usable program code is configured to:
mark all virtual worlds in the universe of virtual worlds as unvisited,
select an unvisited virtual world from the universe of virtual worlds,
select an adaptor corresponding to said selected virtual world,
obtain said plurality of a plurality of object properties for all objects within said selected virtual world,
store said obtained plurality of a plurality of object properties in said publication storage device,
mark said selected virtual world as visited; and
repeat b-f until there are no unvisited virtual worlds.

8. The computer program product of claim 7 comprising computer usable program code to obtain object current locations of said accepted object identifier, said comprised computer usable program code is configured to:
a) create an empty object current location result list,
b) mark all virtual worlds in the universe of virtual worlds as unvisited,
c) select an unvisited virtual world from the universe of virtual worlds,
d) select an adaptor corresponding to said selected virtual world,
e) request object current locations from said virtual world object locator interface means of said selected virtual world based on said accepted object identifier utilizing said selected adaptor,
f) receive object current locations of said accepted object identifier from said virtual world object locator interface means of said selected virtual world utilizing said selected adaptor,
g) include said received object current locations in said object current location result list,
h) mark said selected virtual world as visited,
i) repeat c-h until there are no unvisited virtual worlds, and
j) to provide said object current location result list.

9. The computer program product of claim 7, comprising computer usable program code to obtain said plurality of object properties for all objects within said selected virtual world, said comprised computer usable program code being further configured to:
i) navigate to an initial virtual world viewpoint,
ii) collect descriptive information from each object within view,
iii) determine existence of and navigating to next unvisited viewpoint, and
iv) repeat (ii)-(iii) until all viewpoints are visited.

10. The computer program product of claim 7, further comprising computer usable program code to obtain said plurality of object properties for all objects within said selected virtual world, said computer usable program code being further configured to:
i) navigate to an initial virtual world viewpoint,
ii) collect descriptive information from a plurality of brokers within view, wherein said brokers being server processes that remain stationary across said selected virtual world,
iii) determine existence of and navigating to next unvisited viewpoint, and
iv) repeat (ii)-(iii) until all viewpoints are visited.

11. The computer program product of claim 7, comprising computer usable program code to obtain said plurality of object properties for all objects within said selected virtual world, said comprised computer usable program code is further configured to:
i) place a plurality of brokers in said selected virtual world, said brokers being server processes that remain stationary across said selected virtual world,
ii) collect descriptive information from all objects passing by said brokers,
iii) transmit said collected descriptive information to said adaptor,
iv) release said collected descriptive information, and
v) repeat (ii)-(iv).

12. The computer program product of claim 7, wherein said adaptor provides a standard command interface implemented by the use of a thunk program translating a set of standard commands of said interface into a set of corresponding commands specific to the virtual world to which said adaptor corresponds.

13. A method of deploying a computer program product for locating a three-dimensional object across a universe of virtual worlds, said universe of virtual worlds comprising one or more virtual worlds each virtual world executing as an application program, and accessible via a computer network, said object being uniquely identified by an object identifier, and said object having a plurality of properties associated therewith and said object having one or more a current locations wherein said current location is the object's position within a virtual world, and wherein said object's current location being represented by a URI, wherein, when operational, the computer program performs the steps of:
providing a virtual world object locator interface means associated with a corresponding virtual world, for obtaining one or more object current locations based on an object identifier;
providing a publication storage device populated with a plurality of object properties for all objects in said universe of virtual worlds, said object properties including at least said object identifier;
providing an adaptor corresponding to a virtual world;
receiving user input for object search request;
providing a object search result list comprising one or more said object identifiers from said publication storage device in response to user input wherein said object search result list membership is defined by said user input;

accepting an object identifier from said object search result list in response to user selection of said object identifier;

obtaining object current locations of said accepted object identifier; and providing an object current location result list comprising the current object locations of the accepted object identifier, wherein each object current location result list entry has at least a URI associated therewith, wherein populating said publication storage device with a plurality of object properties comprises:

marking all virtual worlds in the universe of virtual worlds as unvisited;

selecting an unvisited virtual world from the universe of virtual worlds;

selecting an adaptor corresponding to said selected virtual world;

obtaining said plurality of a plurality of object properties for all objects within said selected virtual world;

storing said obtained plurality of object properties in said publication storage device;

marking said selected virtual world as visited; and repeating steps b-f until there are no unvisited virtual worlds.

14. The method of deploying a computer program product for locating a three-dimensional object across a universe of virtual worlds of claim 13, wherein the step obtaining object current locations of said accepted object identifier comprises the steps of:

a) creating an empty object current location result list;

b) marking all virtual worlds in the universe of virtual worlds as unvisited;

c) selecting an unvisited virtual world from the universe of virtual worlds;

d) selecting an adaptor corresponding to said selected virtual world;

e) requesting object current locations from said virtual world object locator interface means of said selected virtual world based on said accepted object identifier utilizing said selected adaptor;

f) receiving object current locations of said accepted object identifier from said virtual world object locator interface means of said selected virtual world utilizing said selected adaptor;

g) including said received object current locations with said object current location result list;

h) marking said selected virtual world as visited;

i) repeating steps c-h until there are no unvisited virtual worlds; and j) providing said object current location result list.

15. The method of claim 13, wherein the step of obtaining said plurality of object properties for all objects within said selected virtual world comprises the steps of:

i) navigating to initial virtual world viewpoint;

ii) collecting descriptive information from each object within view;

iii) navigating to next unvisited viewpoint; and iv) repeating steps (ii)-(iii) until all viewpoints visited.

16. The method of claim 13, wherein the step of obtaining said plurality of object properties for all objects within said selected virtual world comprises the steps:

i) navigating to initial virtual world viewpoint;

ii) collecting descriptive information from a plurality of brokers within view, wherein said brokers being server processes that remain stationary across said selected virtual world;

iii) navigating to next unvisited viewpoint; and iv) repeating steps (ii)-(iii) until all viewpoints visited.

17. The method of claim 13, wherein the step of obtaining said plurality of object properties for all objects within said selected virtual world, comprises the steps:

i) placing a plurality of brokers in said selected virtual world, said brokers being a server processes that remain stationary across said selected virtual world;

ii) collecting descriptive information from all objects passing by said brokers;

iii) transmitting said collected descriptive information to said adaptor;

iv) releasing said collected descriptive information; and v) repeating steps (ii)-(iv).

18. The method of deploying a computer program product for locating a three-dimensional object across a universe of virtual worlds of claim 13, wherein said adaptor provides a standard command interface implemented by the use of a thunk program translating a set of standard commands of said interface into a set of corresponding commands specific to the virtual world to which said adaptor corresponds.

* * * * *